US012754410B2

(12) United States Patent
Chang

(10) Patent No.: US 12,754,410 B2
(45) Date of Patent: Oct. 6, 2026

(54) SIGHT AND COMPENSATING MECHANISM THEREOF

(71) Applicants: Sintai Optical (Shenzhen) Co., Ltd., ShenZhen City (CN); Asia Optical Co., Inc., Taichung (TW)

(72) Inventor: Ken Chiakan Chang, Taichung (TW)

(73) Assignees: SINTAI OPTICAL (SHENZHEN) CO., LTD., Shenzhen City (CN); ASIA OPTICAL CO., INC., Taichung (TW)

(*) Notice: Subject to any disclaimer, the term of this patent is extended or adjusted under 35 U.S.C. 154(b) by 1091 days.

(21) Appl. No.: 17/752,999

(22) Filed: May 25, 2022

(65) Prior Publication Data

US 2022/0390736 A1 Dec. 8, 2022

(30) Foreign Application Priority Data

Jun. 4, 2021 (CN) ........................ 202110623710.X

(51) Int. Cl.
*G02B 23/00* (2006.01)
*G02B 7/02* (2021.01)
(Continued)

(52) U.S. Cl.
CPC ............... *G02B 23/00* (2013.01); *G02B 7/02* (2013.01); *F41G 1/38* (2013.01); *F41G 3/08* (2013.01)

(58) Field of Classification Search
CPC . G02B 7/00; G02B 7/003; G02B 7/02; G02B 7/021; G02B 7/023; G02B 7/028;
(Continued)

(56) References Cited

U.S. PATENT DOCUMENTS 9,423,215 B2 * 8/2016 White ........................ F41G 3/06
9,958,666 B2 * 5/2018 Ingenito ................. G02B 23/16
(Continued)

FOREIGN PATENT DOCUMENTS

CN 106288955 A 1/2017
CN 109932811 A 6/2019
(Continued)

OTHER PUBLICATIONS

English Machine Translation of Chinese reference No. 106288955.*

*Primary Examiner* — Thong Q Nguyen
(74) *Attorney, Agent, or Firm* — McClure, Qualey & Rodack, LLP

(57) ABSTRACT

A sight includes a compensating mechanism. The compensating mechanism includes a base unit, a displaying unit, an adjusting cap and a first transmission unit. The displaying unit is disposed on the base unit and includes a mark. The adjusting cap is disposed outside the displaying unit and includes an information displaying portion for showing the mark. The first transmission unit is connected to the adjusting cap and the displaying unit. The adjusting cap is connected to the transmission unit and includes a groove. When the adjusting cap is rotated with respect to the base unit about an axis, the information displaying portion is synchronously rotated with the adjusting cap and the first transmission unit drives the displaying unit to move along the axis so as to change the mark shown by the information displaying portion.

17 Claims, 4 Drawing Sheets

(51) Int. Cl.
*F41G 1/38* (2006.01)
*F41G 3/08* (2006.01)

(58) Field of Classification Search
CPC . G02B 7/10; G02B 7/16; G02B 23/00; G02B 23/105; G02B 23/12; G02B 23/14; G02B 23/16; G02B 23/165; G02B 23/24; G02B 23/2476
USPC .................................................. 359/399–482
See application file for complete search history.

(56) References Cited

U.S. PATENT DOCUMENTS

| | | | |
|---|---|---|---|
| 2004/0231220 | A1 | 11/2004 | McCormick |
| 2020/0049455 | A1 | 2/2020 | Hamilton et al. |

FOREIGN PATENT DOCUMENTS

| | | | |
|---|---|---|---|
| CN | 110411277 | A | 11/2019 |
| CN | 112823268 | A | 5/2021 |
| DE | 203 01 749 | U1 * | 4/2003 |

* cited by examiner

SIGHT AND COMPENSATING MECHANISM THEREOF

BACKGROUND OF THE INVENTION

Field of the Invention

The invention relates to a compensating mechanism for a sight, and more particularly to a compensating mechanism capable of showing the number of rotation of the adjusting cap and allowing the user to reset the zero-point position for the number of rotation of the adjusting cap.

Description of the Related Art

Generally, a sight is provided with a compensating mechanism for elevation adjustment and windage adjustment. The compensating mechanism has an adjusting cap. In operation, the user rotates the adjusting cap to correct the bullet impact points. For some sights, however, the adjusting caps can be only rotated, without upward/downward movement. For such sights, the number of rotation of the adjusting caps cannot be shown, not to mention resetting the zero-point position for the number of rotation of the adjusting cap. Therefore, operation of such sights is inconvenient.

BRIEF SUMMARY OF THE INVENTION

An object of the invention is to provide a compensating mechanism for a sight to address the above issues. The compensating mechanism of the invention can show the number of rotation of the adjusting caps and allow the user to reset the zero-point position for the number of rotation of the adjusting cap, thus being convenient in operation.

The compensating mechanism in accordance with an exemplary embodiment of the invention includes a base unit, a displaying unit, an adjusting cap and a first transmission unit. The displaying unit is disposed on the base unit and includes a mark. The adjusting cap is disposed outside the displaying unit and includes an information displaying portion for showing the mark. The first transmission unit is connected to the adjusting cap and the displaying unit. The adjusting cap is connected to the transmission unit and includes a groove. When the adjusting cap is rotated with respect to the base unit about an axis, the information displaying portion is synchronously rotated with the adjusting cap and the first transmission unit drives the displaying unit to move along the axis so as to change the mark shown by the information displaying portion.

In another exemplary embodiment, the displaying unit further includes an annular body disposed around the base unit and the mark is disposed on an outer surface of the annular body.

In yet another exemplary embodiment, the annular body includes inner threads, and the base unit includes outer threads mating with the inner threads.

In another exemplary embodiment, the mark includes a plurality of parallel scale lines, and a distance between two adjacent scale lines is equal to a lead of the inner threads.

In yet another exemplary embodiment, the first transmission unit includes a bar, the adjusting cap includes a groove, the groove is elongated, is parallel to the axis and is disposed on an inner surface of the adjusting cap, and the bar is firmly connected to the displaying unit and is extended into the groove in a direction away from the axis.

In another exemplary embodiment, the first transmission unit includes a plurality of bars, the adjusting cap includes a plurality of grooves, the grooves are elongated, are parallel to the axis and are disposed on an inner surface of the adjusting cap, and the bars are firmly connected to the displaying unit and are extended into the grooves in directions away from the axis.

In yet another exemplary embodiment, the bars are equally spaced and are disposed around the axis.

In another exemplary embodiment, the adjusting cap includes a plurality of information displaying portions, and the information displaying portions are equally spaced and are disposed around the axis.

In yet another exemplary embodiment, the compensating mechanism further includes a second transmission unit and an adjusting element, wherein the second transmission unit is connected to the adjusting cap and the adjusting element, the adjusting element is extended to pass through the base unit, wherein the adjusting element is driven by the adjusting cap through the second transmission unit to move along the axis when the adjusting cap is rotated.

In another exemplary embodiment, the information displaying portion is a through hole.

In yet another exemplary embodiment, the information displaying portion is a transparent portion.

A sight in accordance with an exemplary embodiment of the invention includes a main body, an objective lens unit, an ocular lens unit, an erecting lens barrel and the above-mentioned compensating mechanism. The objective lens unit and the ocular lens unit are disposed at both ends of the main body. The erecting lens barrel is disposed within the main body and between the objective lens unit and the ocular lens unit. The compensating mechanism is disposed on the main body, penetrated into the main body and placed against the erecting lens barrel.

In another exemplary embodiment, the base unit is fixed to the main body and the displaying unit further includes an annular body disposed around the base unit and the mark is disposed on an outer surface of the annular body.

In yet another exemplary embodiment, the base unit includes a mount disposed on the main body and a sleeve disposed on the mount, the annular body includes inner threads, and the sleeve includes outer threads mating with the inner threads.

In another exemplary embodiment, the compensating mechanism further includes a second transmission unit and an adjusting element, the second transmission unit is connected to the adjusting cap and the adjusting element, the adjusting element is placed to pass through the mount and the main body and against the erecting lens barrel, and the adjusting element is driven by the adjusting cap through the second transmission unit to move along the axis when the adjusting cap is rotated.

In yet another exemplary embodiment, the base unit further includes an upper cover disposed on the sleeve, the upper cover has a first central hole, the sleeve has a second central hole, and the second transmission unit is penetrated through the first central hole and the second central hole to be rotatably connected to the base unit.

In another exemplary embodiment, the second transmission unit includes a rotary tube rotatably disposed in the sleeve, the rotary tube has an adjusting hole, the mount has a third central hole, and the adjusting element is extended from an interior of the rotary tube through the adjusting hole and the third central hole to an interior of the main body and is propped against the erecting lens barrel.

In yet another exemplary embodiment, the adjusting element includes outer threads and the adjusting hole includes inner threads mating with the outer threads of the adjusting element.

In another exemplary embodiment, the third central hole of the mount has a noncircular cross section, the adjusting element has a cross section corresponding to the noncircular cross section of the third central hole in shape.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
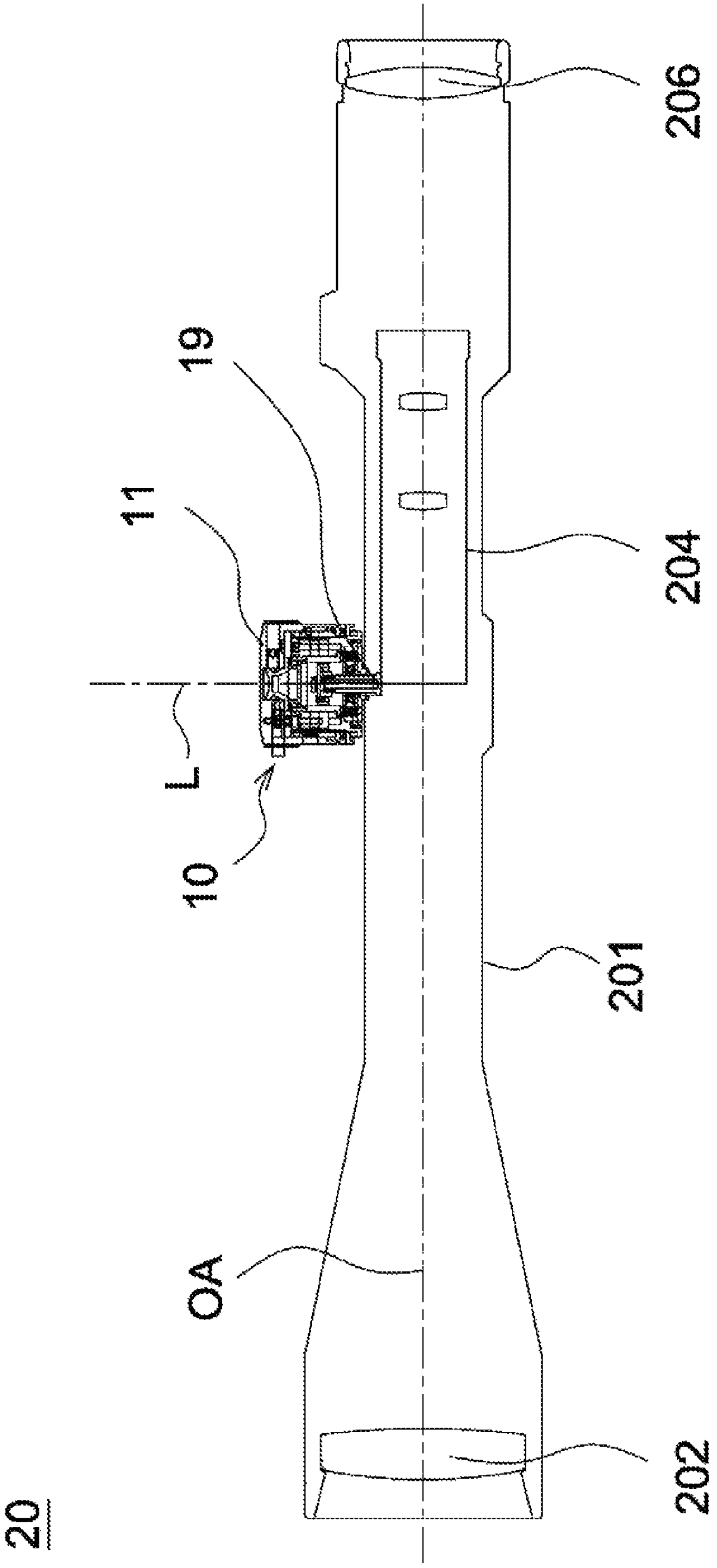
FIG. 1 is a schematic view of a sight in accordance with an embodiment of the invention.

Referring to FIG. 1, in an embodiment of the invention, a sight 20 includes a main body 201, an objective lens unit 202, an erecting lens barrel 204, an ocular lens unit 206 and a compensating mechanism 10. The objective lens unit 202 and the ocular lens unit 206 are disposed at both ends of the main body 201, while the erecting lens barrel 204 is disposed between the objective lens unit 202 and the ocular lens unit 206. Thus, the objective lens unit 202, the erecting lens barrel 204 and the ocular lens unit 206 are sequentially arranged along an optical axis OA. The compensating mechanism 10 is disposed on the main body 201. An adjusting element 19 of the compensating mechanism 10 is propped against the erecting lens barrel 204. During operation, the user rotates the adjusting cap 11 of the compensating mechanism 10 to move the adjusting element 19 along the axis L for correcting the bullet impact point. The detail of the operation will be described later. It is worth noting that the compensating mechanism 10 may be an elevation adjustment mechanism or a windage adjustment mechanism.

Figure 2:
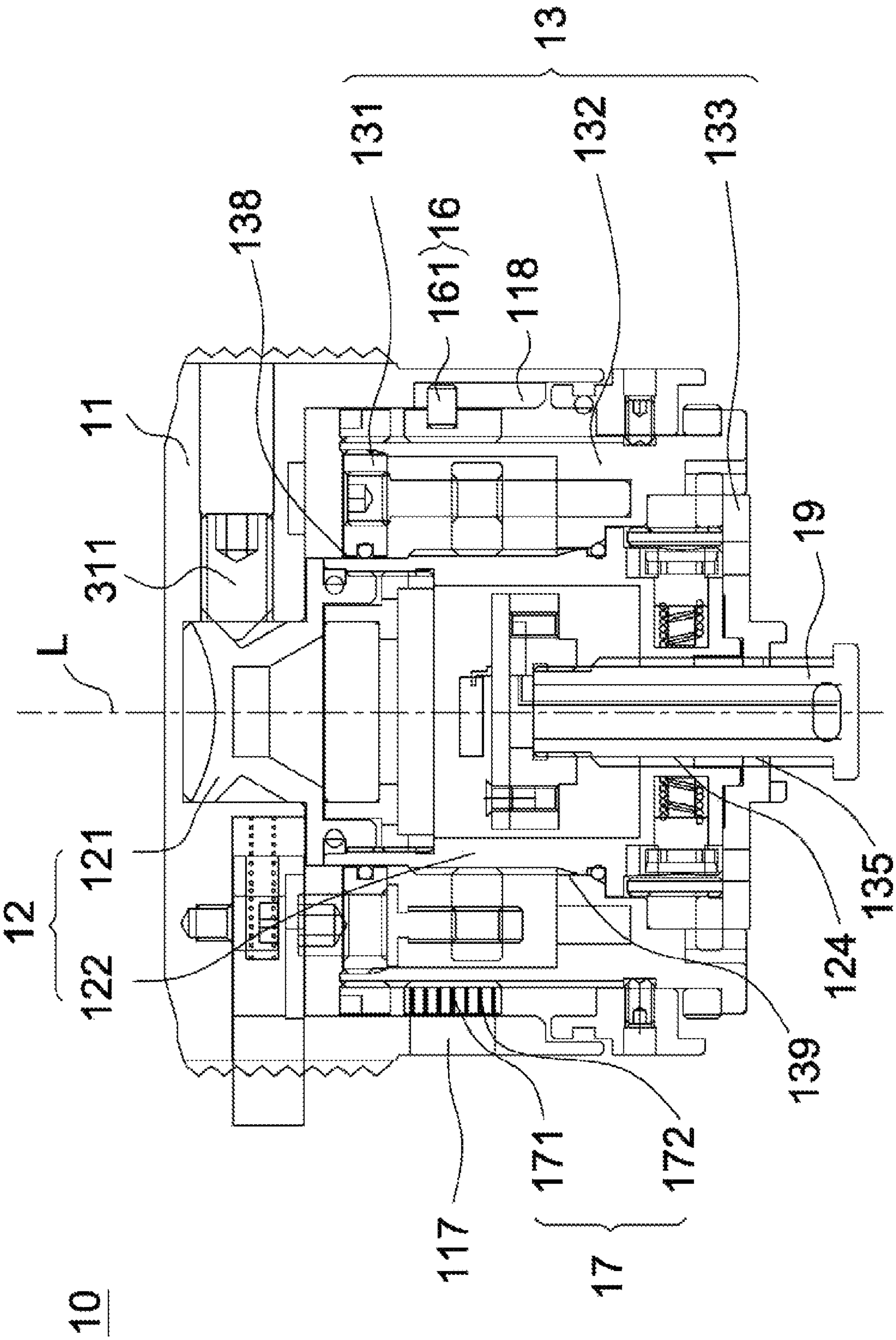
FIG. 2 depicts a sectional view of the compensating mechanism of FIG. 1.
Figure 3:
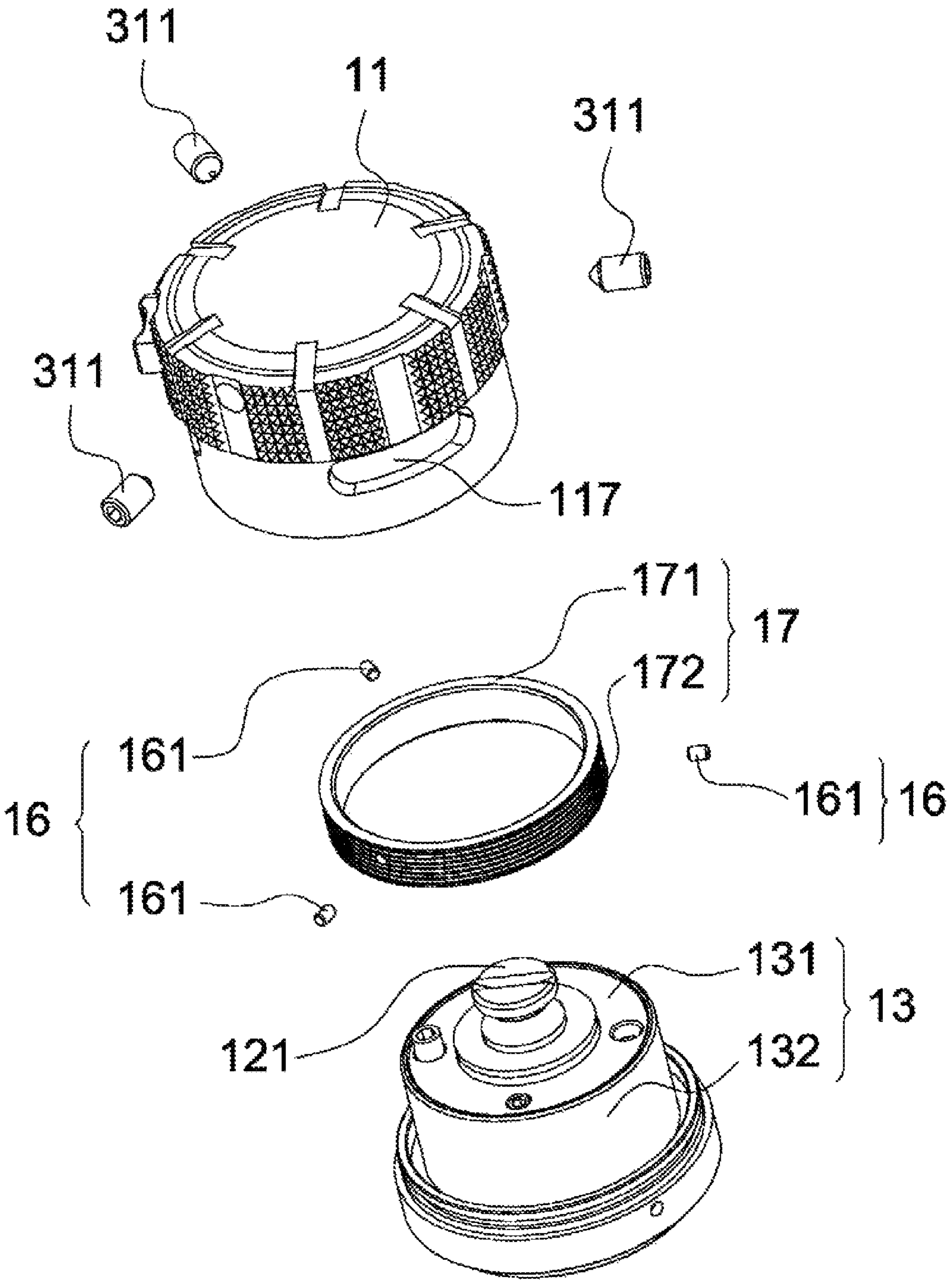
FIG. 3 is an exploded diagram of the compensating mechanism of FIG. 2.

Referring to FIGS. 2 and 3, in addition to the above-mentioned adjusting cap 11 and adjusting element 19, the compensating mechanism in accordance with an embodiment of the invention has a first transmission unit 16, a second transmission unit 12, a displaying unit 17 and a base unit 13.

The base unit 13 is fixed to the main body 201 of the sight 20. The base unit 13 has an upper cover 131, a sleeve 132 and a mount 133. The mount 133 is disposed on the main body 201 of the sight 20. The sleeve 132 is disposed on the mount 133. The upper cover 131 is disposed at an end of the sleeve 132 distant from the mount 133.

The displaying unit 17 has an annular body 171 disposed around the base unit 13. The annular body 171 has inner threads (not shown) formed on its inner circumferential wall. The sleeve 132 has outer threads (not shown) formed on its outer circumferential wall. The outer threads mate with the inner threads so that the annular body 171 can be rotated with respect to the sleeve 132 that is always stationary. The annular body 171 further has a mark 172 disposed on its outer surface. In this embodiment, the mark 172 includes a plurality of parallel scale lines. The distance between two adjacent scale lines is equal to the lead of the inner threads, so that the annular body 171 is moved a distance (equal to the distance between the adjacent scale lines) when rotated a complete round with respect to the sleeve 132. In this embodiment, therefore, the mark 172 is the-number-of-rotation mark.

The upper cover 131 has a first central hole 138. The sleeve 132 has a second central hole 139. The mount 133 has a third central hole 135. The second transmission unit 12 penetrates through the first central hole 138 and the second central hole 139 to be rotatably connected to the base unit 13. Structurally, the second transmission unit 12 has an upper cap 121 and a rotary tube 122. The rotary tube 122 is rotatably disposed in the sleeve 132. The upper cap 121 is disposed at an end of the rotary tube 122 distant from the mount 133. The rotary tube 122 has an adjusting hole 124. The adjusting element 19 is extended from the interior of the rotary tube 122 through the adjusting hole 124 and the third central hole 135 to the interior of the main body 201 of the sight 20, and is propped against the erecting lens barrel 204. The adjusting element 19 has outer threads (not shown) formed on its outer circumferential wall. The adjusting hole 124 has inner threads (not shown) formed on its inner circumferential wall. The outer threads mate with the inner threads. The third central hole 135 of the mount 133 has a cross section, the shape of which is noncircular. The cross section of the adjusting element 19 corresponds to that of the third central hole 135 in shape. By such arrangement, the adjusting element 19 fails to rotate with respect to the base unit 13 wherein the base unit 13 is stationary. Further, the adjusting element 19 can be merely axially moved when the rotary tube 122 of the second transmission unit 12 is rotated with respect to the base unit 13. Further, the rotary tube 122 constrained by the base unit 13 fails to axially move with respect to the base unit 13 when the second transmission unit 12 is rotated with respect to the base unit 13. That is, the rotary tube 122 fails to move along the axis L.

The adjusting cap 11 is fixed to the upper cap 121 of the second transmission unit 12 by means of a plurality of fixing elements 311. Thus, the second transmission unit 12 is driven by the adjusting cap 12 to rotate with respect to the base unit 13 when the adjusting cap 11 is rotated (by the user). The adjusting cap 11 has a plurality of elongated grooves 118 disposed on its inner surface. All the grooves 118 are parallel to the axis L. The first transmission unit 16 has at least one bar 161 fixed to the annular body 171 of the displaying unit 17 and extended into the grooves 118 in the direction away from the axis L. In this embodiment, the first transmission unit 16 has three bars 161. The bars 161 are equally spaced (having 120° therebetween) to surround the axis L. However, the invention is not limited thereto.

The adjusting cap 11 further has at least one information displaying portion 117. The information displaying portion 117 may be a through hole or a transparent portion. The user is able to observe the change of the scale lines through the information displaying portion 117. In this embodiment, there are three information displaying portions 117. The information displaying portions 117 are equally spaced (having 120° therebetween) to surround the axis L. Each information displaying portion 117 is a through hole. However, the invention is not limited thereto.

Figure 4:
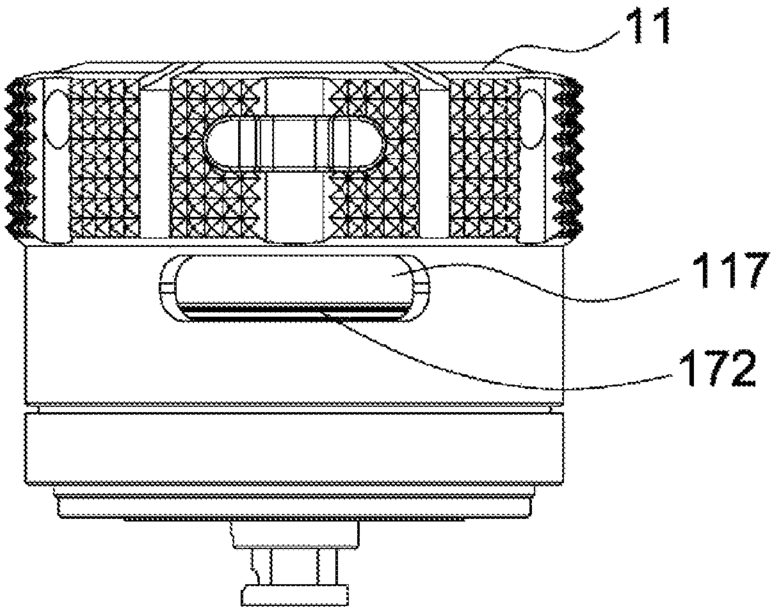
FIG. 4 depicts the appearance of the compensating mechanism of FIG. 2.
Figure 5:
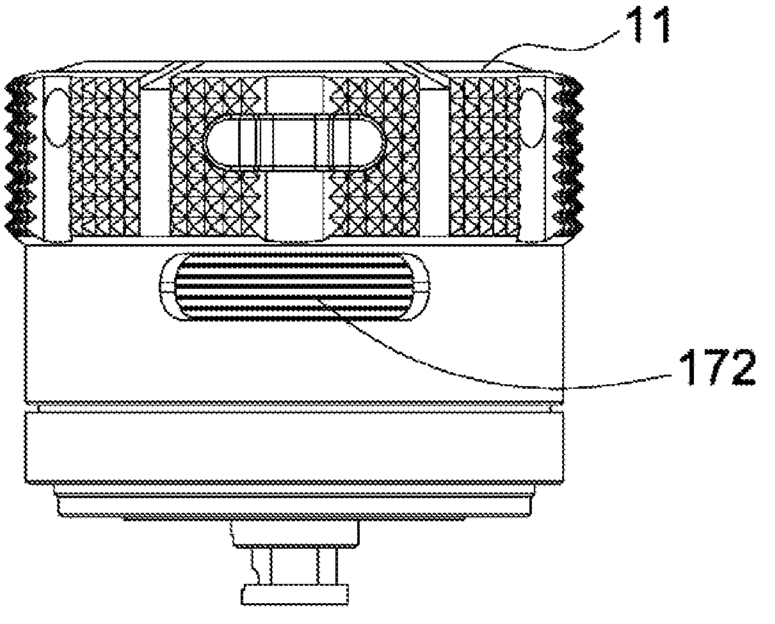
FIG. 5 depicts the appearance of the compensating mechanism of FIG. 2, after the adjusting cap thereof is rotated several rounds.

When a formal shooting begins, the user can rotate the adjusting cap 11 to correct the bullet impact points wherein the adjusting cap 11 drives the second transmission unit 12 to rotate and the second transmission unit 12 drives the adjusting element 19 to axially move with respect to the base unit 13, thereby performing elevation adjustment or windage adjustment for correcting the bullet impact points. The adjusting cap 11 also drives the displaying unit 17 to rotate through the first transmission unit 16. Because the annular body 171 of the displaying unit 17 mates with the sleeve 132 by threads and the first transmission unit 16 is constrained within the groove 118, the annular body 171 is not only rotated with respect to the sleeve 132 but moved along the axis L. Referring to FIG. 4, the user is able to observe the change of the scale lines through the information displaying portion 117. In this embodiment, therefore, the displaying unit 17 is a the-number-of-rotation displaying unit. As described, the mark 172 includes a plurality of parallel scale lines, and the distance between two adjacent scale lines is equal to the lead of the inner threads. Therefore, the annular body 171 is moved a distance (equal to the distance between two adjacent scale lines) along the axis L when rotated a complete round with respect to the sleeve 132. That is, one more scale line is shown by the information displaying portion 117 whenever the adjusting cap 11 is rotated a complete round. For example, the number of the scale lines of FIG. 5 is five more than that of FIG. 4. That means the adjusting cap 11 is rotated five rounds.

When the fixing elements 311 and the adjusting cap 11 are removed from the compensating mechanism 10 for resetting the zero-point position, the user can rotate the annular body 171 of the displaying unit 17 to the lowest position that is the zero-point position for the displaying unit 17. Then, the adjusting cap 11 is put back and fixed by the fixing elements 311 to finish the zero-point setting for the displaying unit 17.

In the above embodiment, the mark 172 includes a plurality of parallel scale lines. However, the invention is not limited thereto. It is understood that the scale lines can be changed to Arabic numerals (e.g. 1, 2, 3 . . . ), Roman numerals (e.g. I, II, III . . . ) or other numbers for ease identification. All of them belong to the category of the invention.

What is claimed is:

1. A compensating mechanism, comprising:

a base unit;

a displaying unit disposed on the base unit and comprising a mark;

an adjusting cap disposed outside the displaying unit and comprising an information displaying portion for showing the mark;

a first transmission unit connected to the adjusting cap and the displaying unit;

wherein the adjusting cap is not linearly movable but rotatable with respect to the base unit;

wherein the adjusting cap is manually rotated with respect to the base unit about an axis, the information displaying portion is synchronously rotated with the adjusting cap and the first transmission unit drives the displaying unit to linearly move along the axis so as to change the mark shown by the information displaying portion; and wherein the first transmission unit comprises at least a bar, the adjusting cap comprises at least a groove, the groove is elongated, is parallel to the axis and is disposed on an inner surface of the adjusting cap, and the bar is firmly connected to the displaying unit and is extended into the groove in a direction away from the axis.

2. The compensating mechanism as claimed in claim 1, wherein the displaying unit further comprises an annular body disposed around the base unit and the mark is disposed on an outer surface of the annular body.

3. The compensating mechanism as claimed in claim 2, wherein the annular body comprises inner threads, and the base unit comprises outer threads mating with the inner threads.

4. The compensating mechanism as claimed in claim 3, wherein the mark comprises a plurality of parallel scale lines, and a distance between two adjacent scale lines is equal to a lead of the inner threads.

5. The compensating mechanism as claimed in claim 1, wherein the first transmission unit comprises a plurality of bars, the adjusting cap comprises a plurality of grooves, the grooves are elongated, are parallel to the axis and are disposed on the inner surface of the adjusting cap, and the bars are firmly connected to the displaying unit and are extended into the grooves in directions away from the axis.

6. The compensating mechanism as claimed in claim 5, wherein the bars are equally spaced and are disposed around the axis.

7. The compensating mechanism as claimed in claim 1, wherein the adjusting cap comprises a plurality of information displaying portions, and the information displaying portions are equally spaced and are disposed around the axis.

8. The compensating mechanism as claimed in claim 1, wherein the mark includes a plurality of numerals.

9. The compensating mechanism as claimed in claim 1, wherein the information displaying portion is a through hole.

10. The compensating mechanism as claimed in claim 1, wherein the information displaying portion is a transparent portion.

11. A sight, comprising:

a main body;

an objective lens unit;

an ocular lens unit, wherein the objective lens unit and the ocular lens unit are disposed at both ends of the main body;

an erecting lens barrel disposed within the main body and between the objective lens unit and the ocular lens unit; and the compensating mechanism as claimed in claim 1, disposed on the main body, penetrated into the main body and placed against the erecting lens barrel.

12. The sight as claimed in claim 11, wherein the base unit is fixed to the main body and the displaying unit further comprises an annular body disposed around the base unit and the mark is disposed on an outer surface of the annular body.

13. The sight as claimed in claim 12, wherein the base unit comprises a mount disposed on the main body and a sleeve disposed on the mount, the annular body comprises inner threads, and the sleeve comprises outer threads mating with the inner threads.

14. A compensating mechanism, comprising:

a base unit;

a displaying unit disposed on the base unit and comprising a mark and an annular body;

an adjusting cap disposed outside the displaying unit and comprising an information displaying portion for showing the mark;

a first transmission unit connected to the adjusting cap and the displaying unit;

wherein the adjusting cap is not linearly movable but rotatable with respect to the base unit;

wherein the adjusting cap is manually rotated with respect to the base unit about an axis, the information displaying portion is synchronously rotated with the adjusting cap and the first transmission unit drives the displaying unit to linearly move along the axis so as to change the mark shown by the information displaying portion;

wherein the annular body comprises inner threads;

wherein the mark comprises a plurality of parallel scale lines, and a distance between two adjacent scale lines is equal to a lead of the inner threads.

15. The compensating mechanism as claimed in claim 14, wherein the annular body of the displaying unit is disposed around the base unit and the mark is disposed on an outer surface of the annular body.

16. The compensating mechanism as claimed in claim 14, wherein the information displaying portion is a through hole or a transparent portion.

17. A compensating mechanism, comprising:

a base unit;

a displaying unit disposed on the base unit and comprising a mark and an annular body disposed around the base unit, the mark being disposed on an outer surface of the annular body;

an adjusting cap disposed outside the displaying unit and comprising an information displaying portion for showing the mark;

a first transmission unit connected to the adjusting cap and the displaying unit;

wherein the adjusting cap is not linearly movable but rotatable with respect to the base unit;

wherein the adjusting cap is manually rotated with respect to the base unit about an axis, the information displaying portion is synchronously rotated with the adjusting cap and the first transmission unit drives the displaying unit to linearly move along the axis so as to change the mark shown by the information displaying portion;

wherein the annular body comprises inner threads, and the base unit comprises outer threads mating with the inner threads; and wherein the mark comprises a plurality of parallel scale lines, and a distance between two adjacent scale lines is equal to a lead of the inner threads.

* * * * *